US012124764B2

(12) United States Patent
Ikeya

(10) Patent No.: US 12,124,764 B2
(45) Date of Patent: Oct. 22, 2024

(54) MAIN TERMINAL FOR ENTERING SAME VIRTUAL SPACE AS SUB TERMINAL, PROGRAM, AND SYSTEM

(71) Applicant: IKEYA SEISAKUSHO CO., LTD., Hamamatsu (JP)

(72) Inventor: Hidesato Ikeya, Hamamatsu (JP)

(73) Assignee: IKEYA SEISAKUSHO CO., LTD., Hamamatsu (JP)

( * ) Notice: Subject to any disclaimer, the term of this patent is extended or adjusted under 35 U.S.C. 154(b) by 0 days.

(21) Appl. No.: 18/289,195

(22) PCT Filed: Apr. 26, 2022

(86) PCT No.: PCT/JP2022/018851
§ 371 (c)(1),
(2) Date: Nov. 1, 2023

(87) PCT Pub. No.: WO2022/239638
PCT Pub. Date: Nov. 17, 2022

(65) Prior Publication Data
US 2024/0220183 A1     Jul. 4, 2024

(30) Foreign Application Priority Data

May 14, 2021 (JP) ................. 2021-082689
Jan. 14, 2022 (JP) ................. 2022-004028

(51) Int. Cl.
*G06F 3/00* (2006.01)
*G06F 3/01* (2006.01)
(Continued)

(52) U.S. Cl.
CPC ............ *G06F 3/1454* (2013.01); *G06F 3/012* (2013.01); *G06F 3/147* (2013.01); *G06T 7/73* (2017.01);
(Continued)

(58) Field of Classification Search
CPC ...... G02B 2027/014; G02B 2027/0178; G02B 27/0172; G02B 27/0176; G06T 19/00; G06T 7/70; H04W 4/026
See application file for complete search history.

(56) References Cited

U.S. PATENT DOCUMENTS

| 2011/0216002 A1 | 9/2011 | Weising et al. |
| 2011/0216060 A1 | 9/2011 | Weising et al. |

(Continued)

FOREIGN PATENT DOCUMENTS

| JP | 2015-192436 A | 11/2015 |
| JP | 2016-071496 A | 5/2016 |

(Continued)

OTHER PUBLICATIONS

Jul. 26, 2022 International Search Report issued in International Patent Application No. PCT/JP2022/018851.
(Continued)

*Primary Examiner* — Insa Sadio
(74) *Attorney, Agent, or Firm* — Oliff PLC

(57) ABSTRACT

Provided is a main terminal capable of entering the same virtual space as a sub terminal present in a visually-recognizable position in real space. The main terminal comprises: a sub-terminal detector acquiring a terminal identifier from each of the sub terminals; a sub-terminal selector selecting one of the sub terminals according to operator operation; a sub-terminal communicator acquiring, from the selected sub terminal, a server address of a virtual space server to which the selected sub terminal is logged in; and a server accessor logging in to the virtual space server with the acquired server address, and enters a same virtual space as the sub terminal. The server accessor preferably accesses a virtual space server located on an external network via a wide-area communication, a locally-placed virtual space server via a narrow-area communication, or a virtual space server installed in the sub terminal via a narrow-area communication.

9 Claims, 9 Drawing Sheets

(51) Int. Cl.
  *G06F 3/14*   (2006.01)
  *G06F 3/147*  (2006.01)
  *G06T 7/73*   (2017.01)
  *G06V 20/20*  (2022.01)

(52) U.S. Cl.
  CPC .... *G06V 20/20* (2022.01); *G06T 2207/30204* (2013.01)

(56) References Cited

U.S. PATENT DOCUMENTS

| | | | | |
|---|---|---|---|---|
| 2012/0192088 A1* | 7/2012 | Sauriol | ................... | G06F 3/012 |
| | | | | 715/757 |
| 2015/0178952 A1* | 6/2015 | Honda | ................... | G06T 11/00 |
| | | | | 345/619 |
| 2019/0238821 A1 | 8/2019 | Lee | | |
| 2022/0284620 A1 | 9/2022 | Hashimoto et al. | | |

FOREIGN PATENT DOCUMENTS

| | | | |
|---|---|---|---|
| JP | 6417467 | B1 | 11/2018 |
| JP | 2020-506565 | A | 2/2020 |
| WO | 2021/053805 | A1 | 3/2021 |

OTHER PUBLICATIONS

Jul. 26, 2022 Written Opinion issued in International Patent Application No. PCT/JP2022/018851.

Naokazu Yokoya. "Mixed Reality: Merging Real and Virtual World—V Examples of Augmented Reality". Institute of Systems, Control and Information Engineers, Aug. 15, 2006, vol. 50, No. 8, pp. 33-38.

SteamVR Lighthouse, May 1, 2021, <URL: https://www.moguravr.com/terms/index-r/lighthouse/#:~:text=Lighthouse%E3%81%A8%E3%81%AF%E3%80%81PC%E5%90%91%E3%81%91,%E3%81%99%E3%82%8B%E3%81%93%E3%81%A8%E3%81%80%E5%8F%AF%E8%83%BD%E3%81%A7%E3%81%99%E3%80%82>.

Rotation Matrix, May 1, 2021, <URL: https://ja.wikipedia.org/wiki/%E5%9B%9E%E8%BB%A2%E8%A1%80%E5%88%97>.

ARToolkit Overview, May 1, 2020, <URL: https://im-lab.net/artoolkit-overview/>.

OpenCV Detection of ArUco Markers, May 1, 2021, <URL: https://docs.opencv.org/master/d5/dae/tutorial_aruco_detection.html>.

SLAM, May 1, 2021, <URL: https://ja.wikipedia.org/wiki/SLAM>.

Kaede Ueno. "Proposal of AR Illustration System to Support Understanding of Pointing Behavior". May 1, 2021, <URL: http://www.res.kutc.kansai-u.ac.jp/~yone/research/pdf_graduate_thesis/201703g_UENO_Kaede.pdf>.

Summary of collision, May 1, 2021, <URL: https://docs.unrealengine.com/ja/InteractiveExperiences/Physics/Collision/Overview/index.html>.

* cited by examiner

MAIN TERMINAL FOR ENTERING SAME VIRTUAL SPACE AS SUB TERMINAL, PROGRAM, AND SYSTEM

TECHNICAL FIELD

The present invention relates to a technology of virtual reality, augmented reality, or mixed reality.

Priority is claimed on Japanese Patent Application No. JP2021-082689 filed on May 14, 2021 and Japanese Patent Application No. JP2022-004028 filed on Jan. 14, 2022 under the Paris Convention, and the content of these Japanese Patent Application Publications is incorporated herein by reference under PCT Rule 20.6.

BACKGROUND ART

Virtual reality refers to a technology for showing a three-dimensional virtual space in a user's visual field with a head mounted display (HMD) terminal worn on the head of the user. The user is allowed to have a sense of immersion into the virtual space while moving. Augmented reality refers to a technology for showing a computer graphics (CG) image on a real space reflected in a user's visual field. For example, a real space is extended in such a manner as to overlappingly show a CG on a see-through display or on an image obtained by photographing the real space with a camera. Mixed reality refers to a technology for merging a virtual space artificially created by CG with a real space. An object in the real space is integrated into the virtual space, and user's own movements has an influence on both of the real space and the virtual space. Using the technologies, an HMD terminal, an AR terminal, and an MR terminal detect user's movements through a posture sensor, acquire virtual space information by accessing a virtual space server, and show the information.

Conventionally, the technology of an experience sharing system among a plurality of users has been known (see, for example, PTL 1). The technology utilizes a smart glass that wirelessly transmits an image photographed by a camera and VR devices that receive the image from the smart glass and display the virtual reality image to the users.

Further, a technology for offering a service via an augmented reality space (or a virtual reality space) has also been known (see, for example, PTL 2). The technology utilizes an IoT device on which an identification code is pasted and an AR device or a VR device that photographs the identification code. The AR device displays, to a user, an augmented reality space that serves as a reference point by reading the identification code, and the IOT device offers a service to the user in cooperation with the augmented reality space.

CITATION LIST

Patent Literature

[PTL 1] Japanese Unexamined Patent Application Publication (Translation of PCT Application) No. 2020-506565
[PTL 2] Japanese Patent No. 6417467

Non-Patent Literature

[NPL 1] SteamVR Lighthouse, [online], [search on May 1, 2021], Internet <URL: https://www.moguravr.com/terms/index-r/lighthouse/#: ~: text=Lighthouse %E3%81%A8%E3%81%AF% 3%80%81PC% E5%90%91%E3%81%91, %3%81%99%E3%82%8B%E3%81%93%E3%81%A8% E3%81%8 C%E5%8F%AF%E8%83%BD%E3%81%A7%E3%81% 99%E3%80%82>
[NPL 2] Rotation Matrix, [online], [search on May 1, 2021], Internet <URL: https://ja.wikipedia.org/wiki/ E5%9B%9E%E8%BB%A2%E8%A1%8C%E5%8 8%97>
[NPL 3] ARToolkit Overview, [online], [search on May 1, 2020], Internet <URL: https://im-lab.net/artoolkit-overview/>
[NPL 4] OpenCV Detection of ArUco Markers, [online], [search on May 1, 2021], Internet <URL: https://docs.opencv.org/master/d5/dae/tutorial_aruco_detection.html>
[NPL 5] SLAM, [online], [search on May 1, 2021], Internet <URL: https://ja.wikipedia.org/wiki/SLAM>
[NPL 6] Proposal of AR Illustration System to Support Understanding of Pointing Behavior, [online], [search on May 1, 2021], Internet <URL: http://www.res.kutc.kansai-u.ac.jp/~yone/research/pdf_graduate_thesis/ 201703g_UENO_Kaede.pdf>
[NPL 7] Summary of collision, [online], [search on May 1, 2021], Internet <URL: https://docs.unrealengine.com/ja/ InteractiveExperiences/Physics/Collision/Overview/index.html>

SUMMARY OF INVENTION

Technical Problem

FIG. 1 is a system configuration diagram in which a plurality of sub terminals are present in a real space visually recognizable by an operator. According to the figure, the operator visually recognizes a plurality of users $a_u$ to $C_u$ present in the real space. Each of the plurality of users $a_u$ to $c_u$ wears a sub terminal 2 such as an HMD terminal on his/her head, and the respective HMD terminals access virtual space servers 3. Thus, each of the sub terminals 2 is capable of reproducing a virtual space desired by its user.

However, there are two problems as follows.

<First Problem>

A virtual space being reproduced by an HMD terminal is experienced under the initiative of a user wearing the HMD terminal. Of course, it is possible to show an image of the virtual space on other displays with an existing technology. However, only the user wearing the HMD terminal is allowed to interfere with the virtual space. Consequently, an experience in the virtual space becomes a really personal thing.

In FIG. 1, it is assumed that, for example, a physically-handicapped person (user) in need of nursing care is caused to wear an HMD terminal (sub terminal 2) and experience a virtual space. In this case, the person in need of nursing care is allowed to personally immerse himself/herself in the virtual space, however a care giver (operator) is not allowed to recognize the virtual space that is visually recognized by the person in need of nursing care through the HMD terminal. Of course, the care giver is also not allowed to assist the operation of the person in need of nursing care with respect to the virtual space. Such a problem is not limited to a nursing scene. For example, a similar problem occurs between a vocational trainee wearing an HMD terminal and an instructor leading training in a virtual space.

In order to solve the problem, the inventor of the present application has conceived the idea of causing an operator to wear, for example, a main terminal (for example, an AR terminal) on his/her head to be allowed to enter the same virtual space as a sub terminal 2 via a see-through display.

Therefore, an object of a first invention of the present application solving the first problem is to provide a main terminal, a program, a system, and a method that are capable of entering the same virtual space as a sub terminal present in a position visually recognizable in a real space.
<Second Problem>

A main terminal 1 worn by an operator is capable of communicating with a plurality of HMD terminals (sub terminals 2) worn by users. However, the operator has a difficulty in selecting a desired HMD terminal from among a plurality of HMD terminals visually recognizable in a real space. An AR terminal may enable an operator to select an HMD terminal, for example, when the operator points a finger at an object of the HMD terminal that is a destination visually recognized by the operator. However, the HMD terminal can be selected only as an object in an image seen from a camera mounted on the AR terminal of the operator. Then, an address (terminal ID) for communicating with the HMD terminal desired by the operator cannot be specified. The address is a terminal ID such as, for example, an IP address, a media access control (MAC) address, and a beacon ID. After all, the main terminal 1 of the operator is not capable of arbitrarily selecting a sub terminal 2 of a user and performing direct communication.

In order to address the problem, the inventor of the present application has conceived the idea of specifying the address of a sub terminal when a user selects the sub terminal as a desired communication party from among a plurality of sub terminals present at positions visually recognizable in a real space.

Therefore, an object of a second invention of the present application solving the second problem is to provide a main terminal, a program, a system, and a method that are capable of selecting a sub terminal present at a position visually recognizable in a real space and communicating with the sub terminal.

Solution to Problem

As the present invention, the first invention solving the first problem and the second invention solving the second problem are disclosed below.
<First Invention>

The first invention of the present application relates to a main terminal, a program, a system, and a method that enters the same virtual space as a sub terminal.

According to the first invention of the present application, there is provided a main terminal capable of communicating with a plurality of sub terminals present at positions visually recognizable in a real space, the main terminal comprising:
  a sub-terminal detector configured to acquire a terminal identifier from each of the sub terminals;
  a sub-terminal selector configured to select one of the sub terminals according to an operator operation;
  a sub-terminal communicator configured to acquire, from the selected sub terminal, a server address of a virtual space server to which the selected sub terminal is logged in; and
  a server accessor configured to log in to the virtual space server corresponding to the server address acquired from the sub terminal,
  the main terminal being configured to enter a same virtual space as the sub terminal.

As another embodiment of the main terminal in the first invention of the present application, it is preferable that the server accessor accesses a virtual space server located on an external network via a wide-area communication, a locally-placed virtual space server via a narrow-area communication, or a virtual space server installed in the sub terminal via a narrow-area communication.

As another embodiment of the main terminal in the first invention of the present application, it is preferable that the main terminal comprises a camera and a posture sensor and further comprises:
  a sub-terminal posture receiver configured to receive, at every predetermined time, a sub-terminal posture $T_{H2}$ in a sub-terminal coordinate system H from each of the sub terminals whose terminal identifiers are acquired by the sub-terminal detector;
  an object recognizer configured to recognize a plurality of sub terminals in a real space from an image photographed by the camera;
  an object posture detector configured to detect, for each of the sub terminals, a sub-terminal posture $T_{A2}$ in a main-terminal coordinate system A relating to the posture sensor of the main terminal from an image photographed by the camera at every predetermined time;
  a posture-displacement detector configured to detect, for each of the sub terminals, a displacement $\Delta T_{H2}$ of the sub-terminal posture $T_{H2}$ in the sub-terminal coordinate system H and a displacement $\Delta T_{A2}$ of the sub-terminal posture $T_{A2}$ in the main-terminal coordinate system A at every predetermined time; and
  a sub-terminal specifier configured to specify, for each of the sub terminals, a sub terminal with a displacement $\Delta T_{A2}$ of the sub-terminal posture $T_{A2}$ in the main-terminal coordinate system A, the displacement $\Delta T_{A2}$ being closest to the displacement $\Delta T_{H2}$ of the sub-terminal posture $T_{H2}$ in the sub-terminal coordinate system H, and make a terminal identifier of the each of the sub terminals correspond to the sub terminal specified from the image,
  wherein the sub-terminal selector causes an object of one sub terminal among a plurality of sub terminals in the real space captured in the image photographed by the camera to be selected according to an operator operation.

As another embodiment of the main terminal in the first invention of the present application, it is preferable that the sub terminal comprises a posture sensor, and:
  the sub-terminal posture $T_{A2}$ in the main-terminal coordinate system A is derived from a position v and an inclination r of the sub terminal captured in the image, the position v and inclination r being values relative to a front surface for a user of the sub terminal; and
  the sub-terminal posture $T_{H2}$ in the sub-terminal coordinate system H is detected by the posture sensor of the sub terminal.

As another embodiment of the main terminal in the first invention of the present application, it is preferable that the front surface for the user of the sub terminal captured in the image, which is used to acquire the sub-terminal posture $T_{A2}$ in the main-terminal coordinate system A, is determined on the basis of a position of a predetermined marker attached on the sub terminal.

As another embodiment of the main terminal in the first invention of the present application, it is preferable that:
  the sub-terminal posture receiver receives a position v and an inclination r in the sub-terminal coordinate system H and determines a posture matrix including the position v and a rotation matrix R generated from the inclination r to the sub-terminal posture $T_{H2}$ in the sub-terminal coordinate system H; and the object posture detector detects, for each of the sub terminals, a position v and an inclination r in the main-terminal coordinate system A from the image photographed by the camera and determines, for each of the sub terminals, a posture matrix including the position v and a rotation matrix R generated from the inclination r to the sub-terminal posture $T_{A2}$ in the main-terminal coordinate system A.

As another embodiment of the main terminal in the first invention of the present application, it is preferable that the main terminal is of glasses type, contact-lens type, or head-mounted type, and allows an operator to visually recognize a plurality of sub terminals present in the real space via see-through or with a display that shows an image captured by a camera.

According to the first invention of the present application, there is provided a non-transitory computer-readable storage medium on which is stored a program to be executed by a computer mounted on a main terminal communicable with a plurality of sub terminals present at positions visually recognizable in a real space, the program causing the computer to function as:

a sub-terminal detector configured to acquire a terminal identifier from each of the sub terminals;

a sub-terminal selector configured to select one of the sub terminals according to an operator operation;

a sub-terminal communicator configured to acquire, from the selected sub terminal, a server address of a virtual space server to which the selected sub terminal is logged in; and a server accessor configured to log in to the virtual space server corresponding to the server address acquired from the sub terminal.

According to the first invention of the present application, there is provided a system comprising a main terminal and a plurality of sub terminals present at positions visually recognizable in a real space from a perspective of the main terminal, the main terminal comprising:

a sub-terminal detector configured to acquire a terminal identifier from each of the sub terminals;

a sub-terminal selector configured to select one of the sub terminals according to an operator operation;

a sub-terminal communicator configured to acquire, from the selected sub terminal, a server address of a virtual space server to which the selected sub terminal is logged in; and a server accessor configured to log in to the virtual space server corresponding to the server address acquired from the sub terminal, the sub terminal being configured to reply with the terminal identifier and the server address in response to a request from the main terminal.

According to the first invention of the present application, there is provided a method for connecting with a virtual space server, the method being performed in a main terminal communicable with a plurality of sub terminals present at positions visually recognizable in a real space, the method comprising:

a first step of acquiring a terminal identifier from each of the sub terminals;

a second step of selecting one of the sub terminals according to an operator operation;

a third step of acquiring, from the selected sub terminal, a server address of a virtual space server to which the selected sub terminal is logged in; and a fourth step of logging in to the virtual space server corresponding to the server address acquired from the sub terminal.

<Second Invention>

The second invention of the present application relates to a main terminal, a program, a system, and a method that specify a sub terminal selected by a user in a real space captured by a camera.

According to the second invention of the present application, there is provided a main terminal comprising a camera and a posture sensor and capable of communicating with a plurality of sub terminals present at positions visually recognizable in a real space, the main terminal comprising:

a sub-terminal detector configured to acquire a terminal identifier from each of the sub terminals;

a sub-terminal posture receiver configured to receive, at every predetermined time, a sub-terminal posture $T_{H2}$ in a sub-terminal coordinate system H from each of the sub terminals;

an object recognizer configured to recognize a plurality of sub terminals in a real space from an image photographed by the camera;

an object posture detector configured to detect, for each of the sub terminals, a sub-terminal posture $T_{A2}$ in a main-terminal coordinate system A relating to the posture sensor of the main terminal from an image photographed by the camera at every predetermined time;

a posture-displacement detector configured to detect, for each of the sub terminals, a displacement $\Delta T_{H2}$ of the sub-terminal posture $T_{H2}$ in the sub-terminal coordinate system H and a displacement $\Delta T_{A2}$ of the sub-terminal posture $T_{A2}$ in the main-terminal coordinate system A at every predetermined time; and a sub-terminal specifier configured to specify, for each of the sub terminals, a sub terminal with a displacement $\Delta T_{A2}$ of the sub-terminal posture $T_{A2}$ in the main-terminal coordinate system A, the displacement $\Delta T_{A2}$ being closest to the displacement $\Delta T_{H2}$ of the sub-terminal posture $T_{H2}$ in the sub-terminal coordinate system H, and make a terminal identifier of the each of the sub terminals correspond to the sub terminal specified from the image.

As another embodiment in the second invention of the present application, it is preferable that the main terminal further comprises:

a sub-terminal selector configured to cause an object of one sub terminal among a plurality of sub terminals in the real space captured in the image photographed by the camera to be selected according to an operator operation and specify a terminal identifier of the one sub terminal; and a sub-terminal communicator configured to communicate with the one sub terminal corresponding to the specified terminal identifier.

As another embodiment in the second invention of the present application, it is preferable that:

the sub-terminal communicator acquires, from one sub terminal, a server address of a virtual space server to which the one sub terminal is logged in; and the main terminal further comprises a server accessor configured to log in to a virtual space server corresponding to the server address acquired from the one sub terminal and enters a same virtual space as the one sub terminal.

As another embodiment in the second invention of the present application, it is preferable that the server accessor logs in to a virtual space server located on an outside via a network, or logs in to a virtual space server installed in the sub terminal via a narrow-area communication.

As another embodiment in the second invention of the present application, it is preferable that:
- the sub terminal comprises a posture sensor;
- the main-terminal coordinate system A is a coordinate system of the main terminal;
- the sub-terminal posture $T_{A2}$ in the main-terminal coordinate system A is derived from an inclination r of the sub terminal captured in the image, the inclination r being a value relative to a front surface for a user of the sub terminal;
- the sub-terminal coordinate system H is a coordinate system of the sub terminal; and
- the sub-terminal posture $T_{H2}$ in the sub-terminal coordinate system H is detected by the posture sensor of the sub terminal.

As another embodiment in the second invention of the present application, it is preferable that the front surface for the user of the sub terminal captured in the image, which is used to acquire the sub-terminal posture $T_{A2}$ in the main-terminal coordinate system A, is determined on the basis of a position of a predetermined marker attached on the sub terminal.

As another embodiment in the second invention of the present application, it is preferable that:
- the sub-terminal posture receiver receives a position v and an inclination r in the sub-terminal coordinate system H and determines a posture matrix including the position v and a rotation matrix R generated from the inclination r to the sub-terminal posture $T_{H2}$ in the sub-terminal coordinate system H; and
- the object posture detector detects, for each of the sub terminals, a position v and an inclination r in the main-terminal coordinate system A from the image photographed by the camera and determines, for each of the sub terminals, a posture matrix including the position v and a rotation matrix R generated from the inclination r to the sub-terminal posture $T_{A2}$ in the main-terminal coordinate system A.

As another embodiment in the second invention of the present application, it is preferable that the main terminal is of glasses type, contact-lens type, or head-mounted type, and allows an operator to visually recognize a plurality of sub terminals present in the real space via see-through or with a display that shows an image captured by a camera.

According to the second invention of the present application, there is provided a non-transitory computer-readable storage medium on which is stored a program to be executed by a computer mounted on a main terminal that comprises a camera and a sensor and is communicable with a plurality of sub terminals present at positions visually recognizable in a real space, the program causing the computer to function as:
- a sub-terminal detector configured to acquire a terminal identifier from each of the sub terminals;
- a sub-terminal posture receiver configured to receive, at every predetermined time, a sub-terminal posture $T_{H2}$ in a sub-terminal coordinate system H from each of the sub terminals;
- an object recognizer configured to recognize a plurality of sub terminals in a real space from an image photographed by the camera;
- an object posture detector configured to detect, for each of the sub terminals, a sub-terminal posture $T_{A2}$ in a main-terminal coordinate system A relating to the posture sensor of the main terminal from an image photographed by the camera at every predetermined time;
- a posture-displacement detector configured to detect, for each of the sub terminals, a displacement $\Delta T_{H2}$ of the sub-terminal posture $T_{H2}$ in the sub-terminal coordinate system H and a displacement $\Delta T_{A2}$ of the sub-terminal posture $T_{A2}$ in the main-terminal coordinate system A at every predetermined time; and
- a sub-terminal specifier configured to specify, for each of the sub terminals, a sub terminal with a displacement $\Delta T_{A2}$ of the sub-terminal posture $T_{A2}$ in the main-terminal coordinate system A, the displacement $\Delta T_{A2}$ being closest to the displacement $\Delta T_{H2}$ of the sub-terminal posture $T_{H2}$ in the sub-terminal coordinate system H, and make a terminal identifier of the each of the sub terminals correspond to the sub terminal specified from the image.

According to the second invention of the present application, there is provided a system comprising: a main terminal comprising a camera and a sensor; and a plurality of sub terminals present at positions visually recognizable in a real space from a perspective of the main terminal, the main terminal comprising:
- a sub-terminal detector configured to acquire a terminal identifier from each of the sub terminals;
- a sub-terminal posture receiver configured to receive, at every predetermined time, a sub-terminal posture $T_{H2}$ in a sub-terminal coordinate system H from each of the sub terminals;
- an object recognizer configured to recognize a plurality of sub terminals in a real space from an image photographed by the camera;
- an object posture detector configured to detect, for each of the sub terminals, a sub-terminal posture $T_{A2}$ in a main-terminal coordinate system A relating to the posture sensor of the main terminal from an image photographed by the camera at every predetermined time;
- a posture-displacement detector configured to detect, for each of the sub terminals, a displacement $\Delta T_{H2}$ of the sub-terminal posture $T_{H2}$ in the sub-terminal coordinate system H and a displacement $\Delta T_{A2}$ of the sub-terminal posture $T_{A2}$ in the main-terminal coordinate system A at every predetermined time; and
- a sub-terminal specifier configured to specify, for each of the sub terminals, a sub terminal with a displacement $\Delta T_{A2}$ of the sub-terminal posture $T_{A2}$ in the main-terminal coordinate system A, the displacement $\Delta T_{A2}$ being closest to the displacement $\Delta T_{H2}$ of the sub-terminal posture $T_{H2}$ in the sub-terminal coordinate system H, and make a terminal identifier of the each of the sub terminals correspond to the sub terminal specified from the image, and the sub terminal comprising:
- a sub-terminal identifier returner configured to reply with the terminal identifier in response to a request from the main terminal; and
- a sub-terminal posture transmitter configured to transmit the sub-terminal posture $T_{H2}$ in a sub-terminal coordinate system H at every predetermined time.

According to the second invention of the present application, there is provided a method for specifying a sub terminal, the method being performed in a main terminal that comprises a camera and a sensor and is communicable with a plurality of sub terminals present at positions visually recognizable in a real space, the method comprising:
- a first step of acquiring a terminal identifier from each of the sub terminals;
- a second step of receiving, at every predetermined time, a sub-terminal posture $T_{H2}$ in a sub-terminal coordinate system H from each of the sub terminals;
- a third step of recognizing a plurality of sub terminals in a real space from an image photographed by the camera;
- a fourth step of detecting, for each of the sub terminals, a sub-terminal posture $T_{A2}$ in a main-terminal coordinate system A relating to the posture sensor of the main terminal from an image photographed by the camera at every predetermined time;
- a fifth step of detecting, for each of the sub terminals, a displacement $\Delta T_{H2}$ of the sub-terminal posture $T_{H2}$ in the sub-terminal coordinate system H and a displacement $\Delta T_{A2}$ of the sub-terminal posture $T_{A2}$ in the main-terminal coordinate system A at every predetermined time; and
- a sixth step of specifying, for each of the sub terminals, a sub terminal with a displacement $\Delta T_{A2}$ of the sub-terminal posture $T_{A2}$ in the main-terminal coordinate system A, the displacement $\Delta T_{A2}$ being closest to the displacement $\Delta T_{H2}$ Of the sub-terminal posture $T_{H2}$ in the sub-terminal coordinate system H, and make a terminal identifier of the each of the sub terminals correspond to the sub terminal specified from the image.

Advantageous Effects of Invention

The main terminal, the program, the system, and the method according to the first invention of the present application are capable of entering the same virtual space as a sub terminal present in a position visually recognizable in a real space. And the main terminal, the program, the system, and the method according to the second invention of the present application are capable of selecting a sub terminal present at a position visually recognizable in a real space and communicating with the sub terminal.

DESCRIPTION OF EMBODIMENTS

Hereinafter, embodiments for carrying out the present invention will be described in detail using the drawings.

Figure 1:
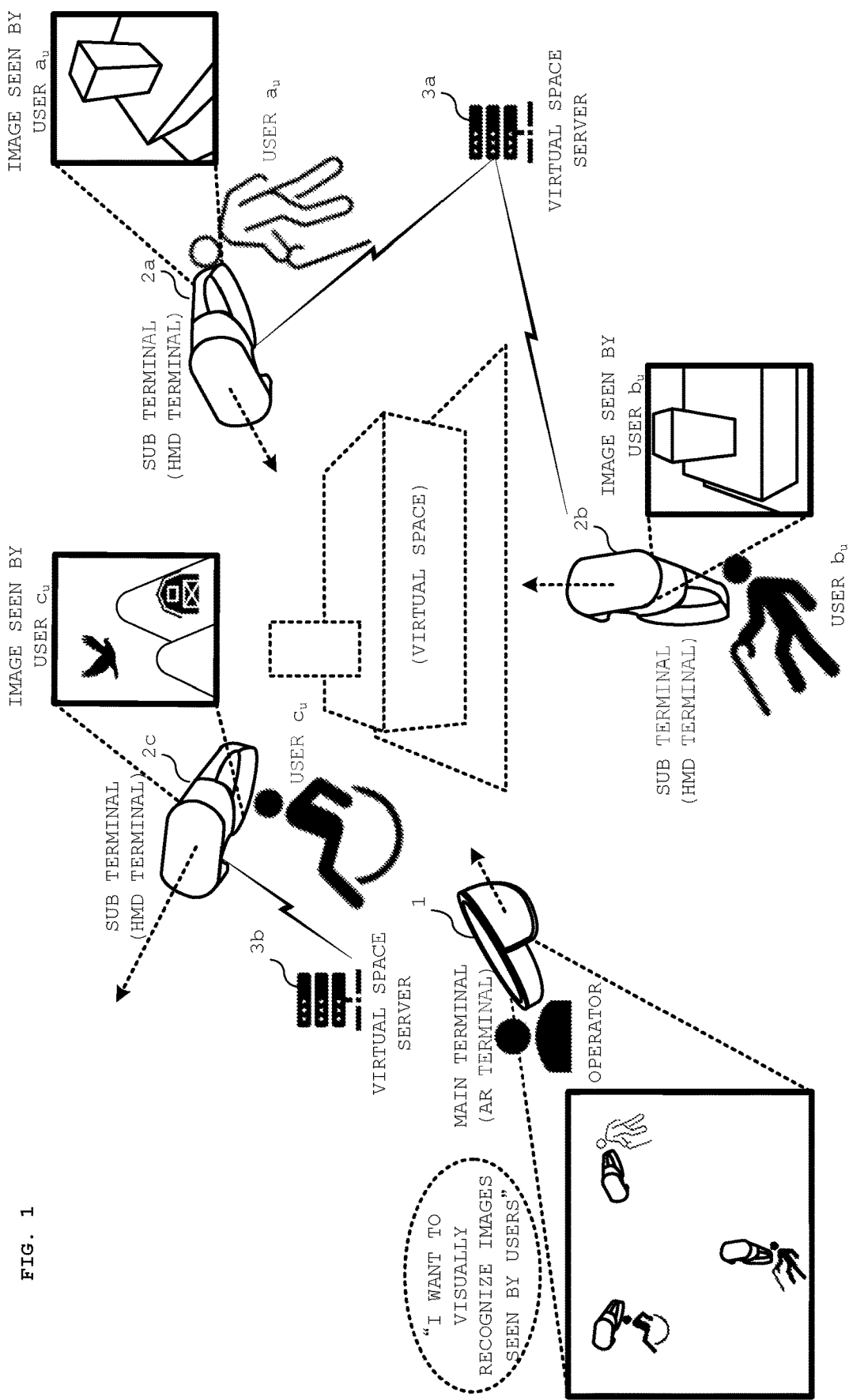
FIG. 1 is a system configuration diagram in which a plurality of sub terminals are present in a real space visually recognizable by an operator.
Figure 2:
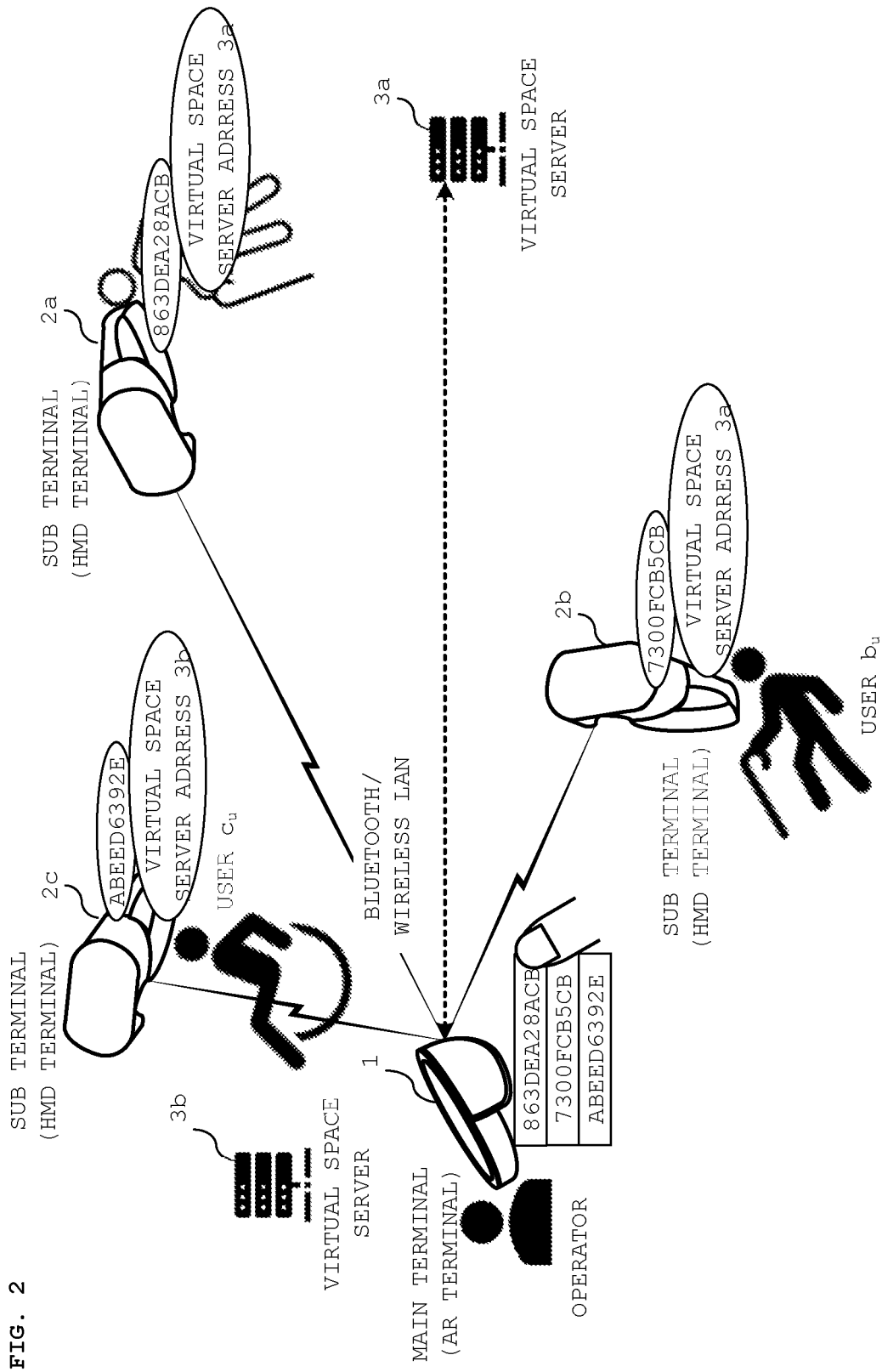
FIG. 2 is a system configuration diagram in the present invention.

FIG. 2 is a system configuration diagram in the present invention.

Conventionally, a virtual space server generally allows a plurality of users at remote locations to be present in the same virtual space. In contrast, in the present invention, a main terminal 1 possessed by an operator and sub terminals 2 possessed by users are present at positions visible one another in a real space. That is, the present invention is particularly applied to cases in which terminals are close to each other in a real space.

The main terminal 1 is, for example, a glasses-type augmented reality (AR) terminal, and capable of showing a CG in a virtual space on its see-through display. An operator wears the main terminal 1, and is capable of visually recognizing a plurality of users $a_u$ to $c_u$ via the see-through display. On the other hand, the sub terminals 2 are, for example, head mounted display (HMD) terminals, and capable of accessing virtual space servers 3. It is assumed that the users $a_u$ to $c_u$ wear the HMDs and experience virtual spaces.

In FIG. 2, the main terminal 1 is an AR terminal, however may also be a mixed reality (MR) terminal, and is not limited to such terminals. The main terminal 1 may also be a terminal of a contact-lens type or an HMD terminal that is equipped with a camera and reproduces an outside image. The operator is allowed to visually recognize the plurality of sub terminals 2 present in a real space in a see-through manner or via a display that shows an image photographed by a camera. On the other hand, the sub terminals 2 are HMD terminals, however may also be, of course, AR terminals or MR terminals, and are not limited to such terminals. The main terminal 1 and the sub terminals 2 may also be terminals such as, for example, smart phones in which a camera and a display are installed, or may also be tablet computers or personal computers.

According to FIG. 2, the main terminal 1 communicates with the plurality of sub terminals 2 via a narrow-area communication. The narrow-area communication may be wireless communication or wired communication. Particularly, the narrow-area communication is preferably a near-range wireless communication such as, for example, Bluetooth (Registered Trademark) and Zigbee (Registered Trademark) or a narrow-area wireless network such as a wireless LAN. In the case of, for example, Bluetooth, Bluetooth low energy (BLE) having a narrow radio-wave reaching range is particularly suitable. The BLE operates with about one-third power as a low power consumption Bluetooth, and is therefore capable of suppressing power consumption of the main terminal 1 and the sub terminals 2. For example, the sub terminals 2 transmit advertising packets at all times as tag devices. The advertising packets are periodically transmitted at an interval of, for example, 100 ms. According to the BLE specifications, the sub terminals 2 are caused to function as advertisers, and the advertising packets include beacon IDs as terminal IDs.

According to FIG. 2, the main terminal 1 is also capable of accessing the virtual space servers 3. The virtual space servers 3 are classified into, for example, the following three patterns in terms of their locations:
  (1) virtual space server (dedicated server) located on an external network (Internet);
  (2) virtual space server (dedicated server) locally disposed; and (3) virtual space server (listen server) installed in the sub terminal.

Here, when the virtual space servers 3 are located on the Internet, the main terminal 1 is connected to the Internet via a wide-area communication. The wide-area communication serving as an interface may also be wireless communication or wired communication. On the other hand, when the virtual space servers 3 are disposed locally or in sub terminals themselves, the main terminal 1 is capable of performing communication via a narrow-area communication.

According to FIG. 2, each of the sub terminals 2 communicates with the main terminal 1 using its own terminal ID. Further, as a characteristic of the present invention, the sub terminals 2 are capable of replying, to the main terminal 1, with the addresses of the virtual space servers 3 being experienced by their users in response to a request from the main terminal 1.

<First Invention>

According to a main terminal, a program, a system, and a method as a first invention of the present application, it is possible to enter the same virtual space as a sub terminal present at a position visually recognizable in a real space from the perspective of the main terminal.

Figure 3:
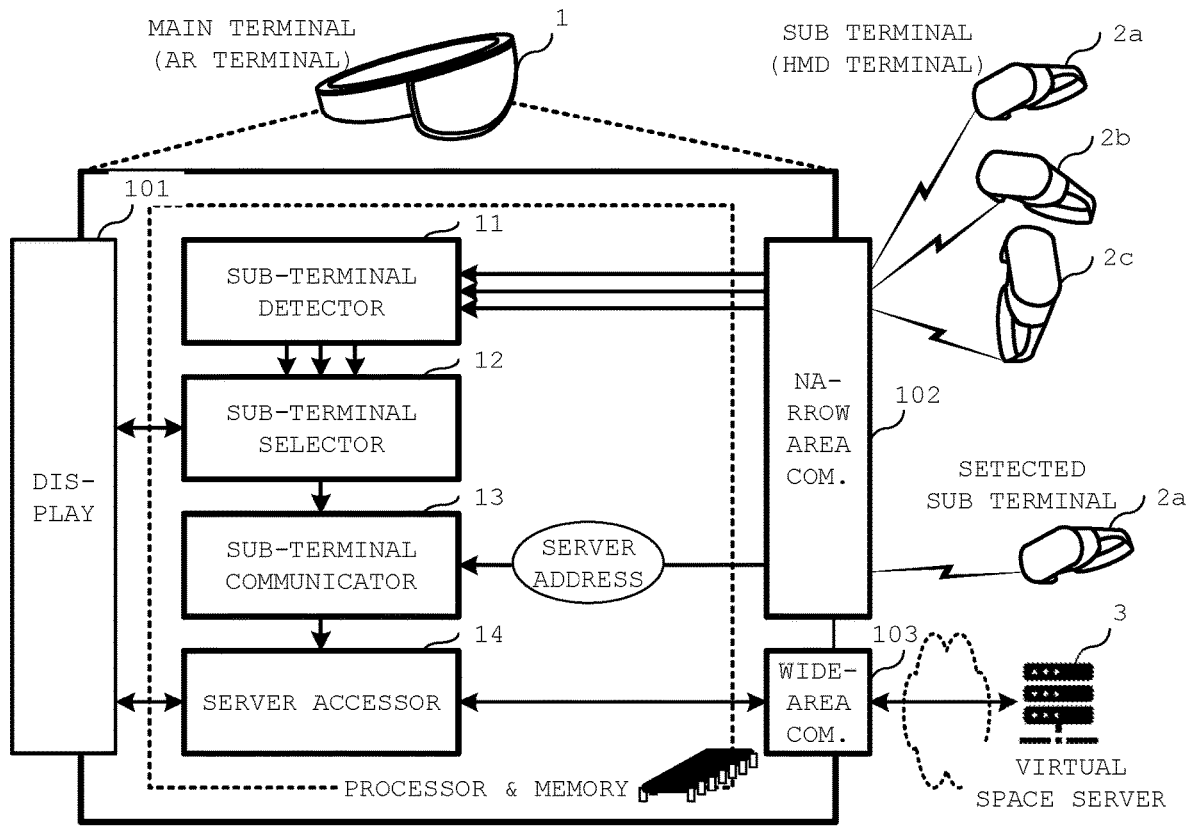
FIG. 3 is a functional configuration diagram of a main terminal according to the first invention.
Figure 3:
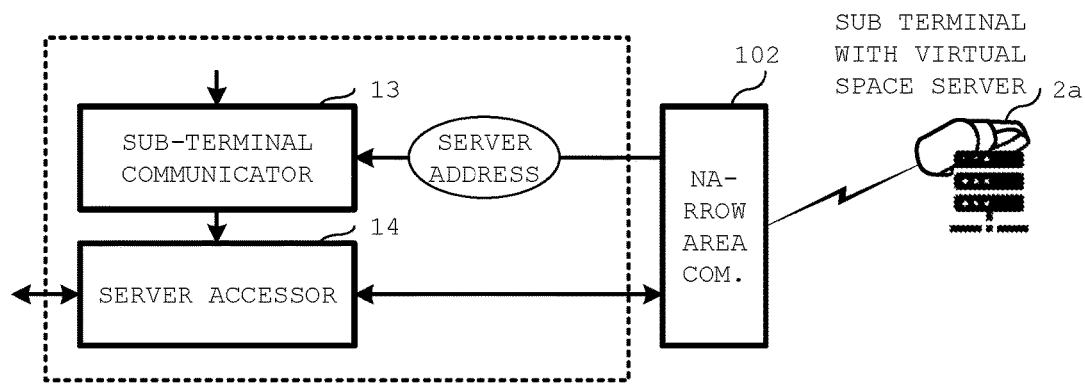
Figure 4:
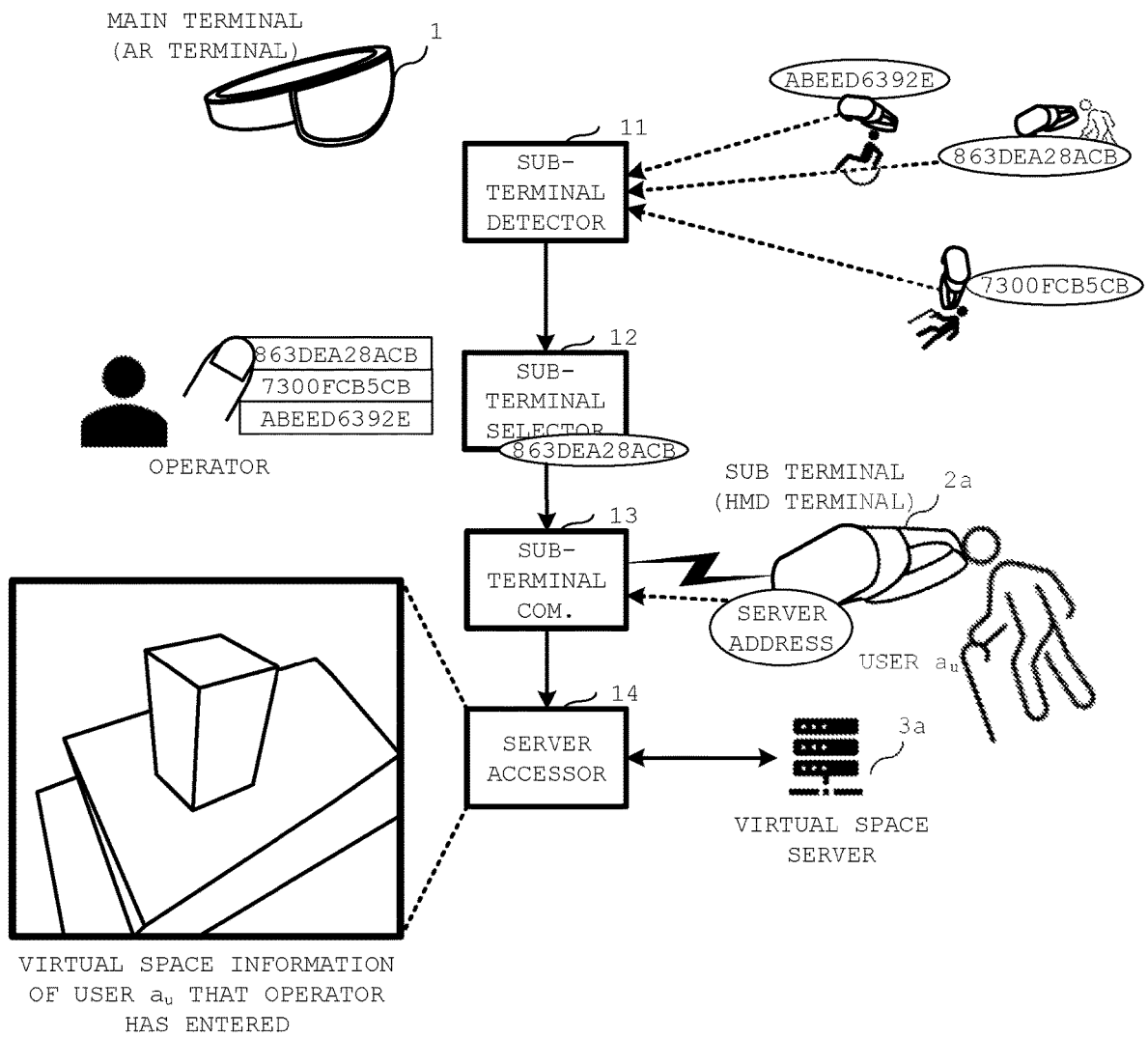
FIG. 4 is an explanatory diagram showing the processing flow implemented in a main terminal according to the first invention.

FIG. 3 is a functional configuration diagram of a main terminal according to the first invention. FIG. 4 is an explanatory diagram showing the processing flow implemented in a main terminal according to the first invention.

According to FIG. 3, a main terminal 1 is equipped with at least a display 101 and a narrow-area communicator (narrow-area communication unit) 102 as its hardware. The main terminal 1 also requires a wide-area communicator (wide-area communication unit) 103 depending on the location of a virtual space server 3 to be accessed. According to FIG. 3, the main terminal 1 includes a sub-terminal detector (sub-terminal detection unit) 11, a sub-terminal selector (sub-terminal selection unit) 12, a sub-terminal communicator (sub-terminal communication unit) 13, and a server accessor (server access unit) 14. These functional configuration units can be regarded as functions embodied when an embodiment of the program according to the present invention is executed, which is stored in a processor and memory (a computation processing system including a memory function) installed in the main terminal 1. Further, in FIG. 3, the processing flow indicated by connecting the functional configuration units of the main terminal 1 with arrows is also understood as an embodiment of the method for entering a virtual space according to the present invention.

(Sub-Terminal Detector 11)

The sub-terminal detector (sub-terminal detection unit) 11 is configured to acquire a terminal ID from each of the sub terminals 2. The terminal ID may be, for example, a beacon ID, an IP address, or a media access control (MAC) address. For example, when the narrow-area communication is BLE, the sub terminals 2 periodically transmit terminal IDs, and the sub-terminal detector 11 of the main terminal 1 is capable of receiving the terminal IDs. For example, when the narrow-area communication is wireless LAN, the sub-terminal detector 11 of the main terminal 1 is capable of receiving terminal IDs from the sub terminals 2 by multicasting an inquiry request. The acquired terminal IDs are output to the sub-terminal selector 12.

(Sub-Terminal Selector 12)

The sub-terminal selector (sub-terminal selection unit) 12 is configured to select one of the sub terminals 2 according to an operator operation. The terminal ID of the selected sub terminal 2 is output to the sub-terminal communicator 13.

The sub-terminal selector 12 may show a plurality of terminal IDs acquired from, for example, its periphery on the display 101 and allow an operator to select one of the shown terminal IDs. The respective terminal IDs may also be shown on the display 101 in association with user identification names preset in advance so as to be easily selected by the operator. According to FIG. 4, beacon IDs acquired from the plurality of sub terminals 2 are shown, and the operator is allowed to select any of the sub terminals 2 on his/her own. Note that as for the function of selecting the sub terminals 2, an object in an image of a camera visually recognized by the operator can be made to be mapped to the acquired terminal ID using a second invention of the present application.

(Sub-Terminal Communicator 13)

The sub-terminal communicator (sub-terminal communication unit) 13 is configured to acquire, from a sub terminal 2 selected by the sub terminal selector 12, the server address of a virtual space server 3 to which the sub terminal 2 is logged in. The acquired server address is output to the server accessor 14.

For example, the main terminal 1 transmits a server address request to the sub terminal 2. In response to this, the sub terminal 2 replies, to the main terminal 1, with the server address of a virtual space server 3 to which the sub terminal 2 is accessing. The server address may be a uniform resource locator (URL), an IP address, a port number, or other information required to access the virtual space server.

(Server Accessor 14)

The server accessor (server access unit) 14 is configured to log in to a virtual space server 3 corresponding to the server address acquired from the sub terminal 2 by the sub-terminal communicator 13.

Thus, according to the first invention of the present application, it is possible to enter the same virtual space as a sub terminal present at a position visually recognizable in a real space from the perspective of the main terminal.

<Second Invention>

According to a main terminal, a program, a system, and a method as a second invention of the present application, it is possible to select a sub terminal present at a position visually recognizable in a real space from the perspective of the main terminal and communicate with the sub terminal.

Figure 5:
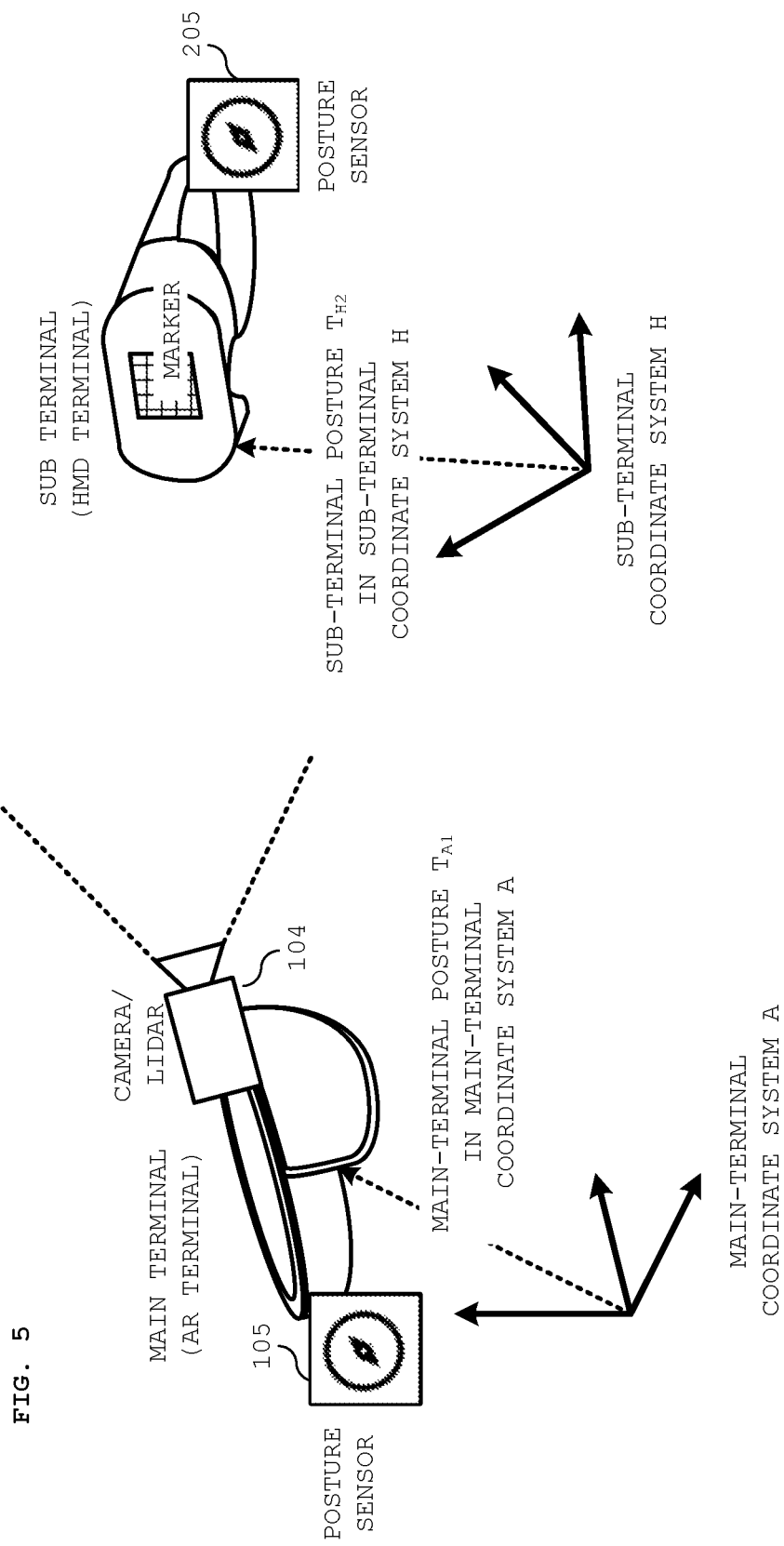
FIG. 5 is a system configuration diagram in the second invention.

FIG. 5 is a system configuration diagram in the second invention.

According to FIG. 5, a main terminal 1 further has a camera 104 in comparison with the main terminal 1 shown in FIG. 2.

(Camera 104)

The camera 104 may be a general 2D camera or a 3D camera. For example, the camera 104 may be a light detection and ranging (LiDAR) that uses laser. Note that the main terminal 1 may also have an ultra-wide band (UWB) sensor instead of a camera.

Further, according to FIG. 5, the main terminal 1 and the sub terminal 2 have a posture sensor 105 and a posture sensor 205, respectively, in addition to the configuration shown in FIG. 2.

(Posture Sensors 105 and 205)

The posture sensors 105 and 205 detect a position v and an inclination r as their own posture (transformation matrix, Transform) at all times during activation. According to FIG. 5, postures are shown as follows.

$T_{A1}$: a main-terminal posture in a main-terminal coordinate system A $T_{H2}$: a sub-terminal posture in a sub-terminal coordinate system H Note that the main-terminal coordinate system A is assumed as a reference coordinate system set at device activation. Similarly, the sub-terminal coordinate system H is also assumed as a reference coordinate system set at device activation.

The posture sensors 105 and 205 include an inertial measurement unit (IMU) to detect an inclination r. The IMU is the same as one installed in a general smart phone or the like. Further, in order to detect a position v, the posture sensors 105 and 205 includes a tracking device such as, for example, Lighthouse (Registered Trademark) of SteamVR (Registered Trademark) installed in a head mounted display (see, for example, NPL 1). The tracking devices are capable of tracking the positions v of the main terminal 1 and the sub terminal 2 in a predetermined range by communicating with an anchor (base station) provided in a real space. Alternatively, the posture sensors 105 and 205 may include the above-described IMU or camera and be capable of tracking their own positions v and inclinations r at the same time using simultaneous localization and mapping (SLAM) (see, for example, NPL 5).

As a posture in the present invention, a posture T (4×4 matrix) is defined as follows by using a position v (3×1 matrix) in a real space (three-dimensional space) and a rotation matrix R (3×3 matrix) calculated from an inclination r (3×1 matrix) (see, for example, NPL 2).

$$\text{Position: } v = \begin{pmatrix} x \\ y \\ z \end{pmatrix} \text{Inclination: } r = \begin{pmatrix} \alpha \\ \beta \\ \gamma \end{pmatrix} \text{Posture: } T = \begin{pmatrix} R & v \\ 0^T & 1 \end{pmatrix} \quad [\text{Math. 1}]$$

Thus, the posture T can be derived from the position v and the inclination r. Conversely, the position v and the inclination r can be derived from the posture T.

Figure 6:
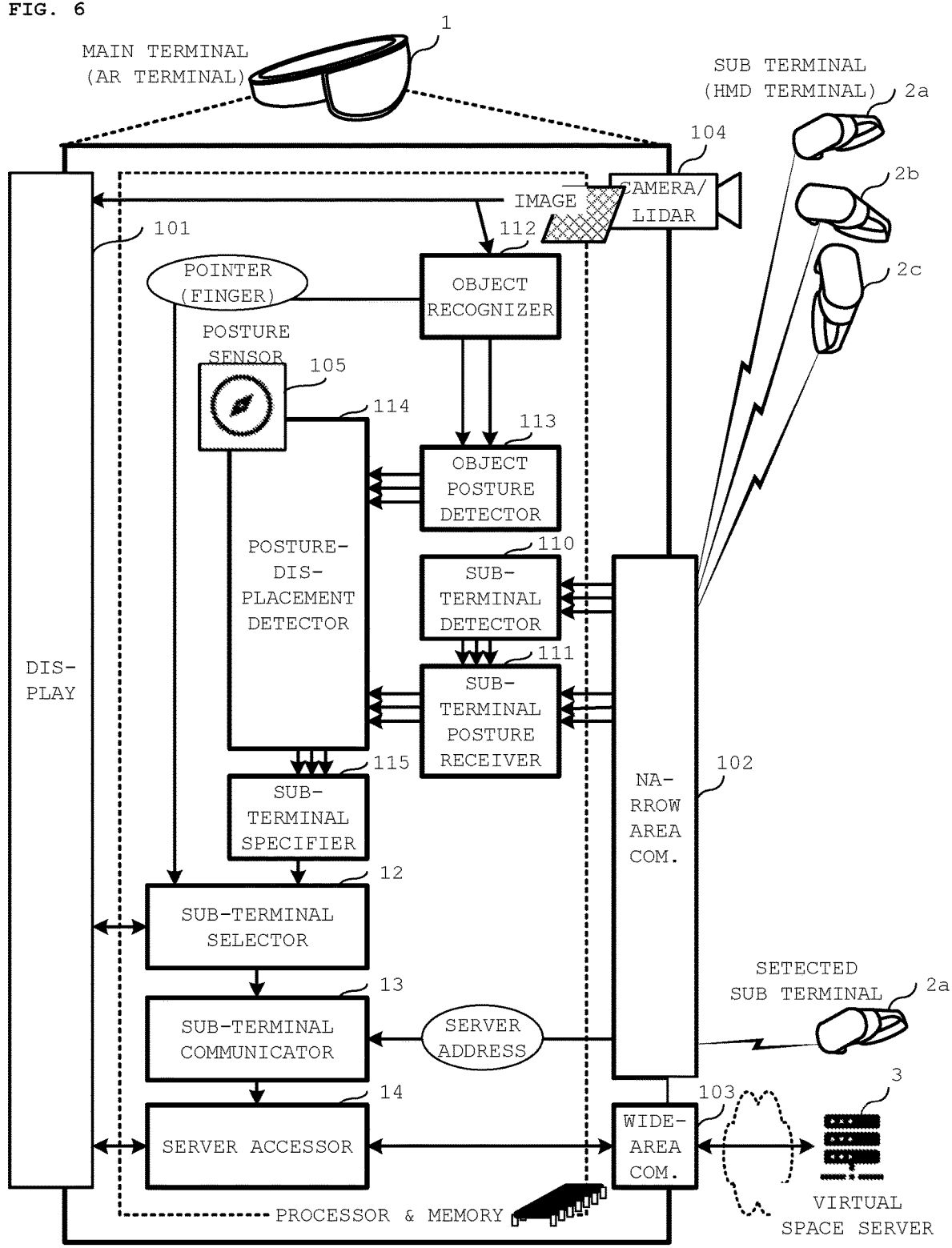
FIG. 6 is a function configuration diagram of a main terminal according to the second invention.
Figure 7:
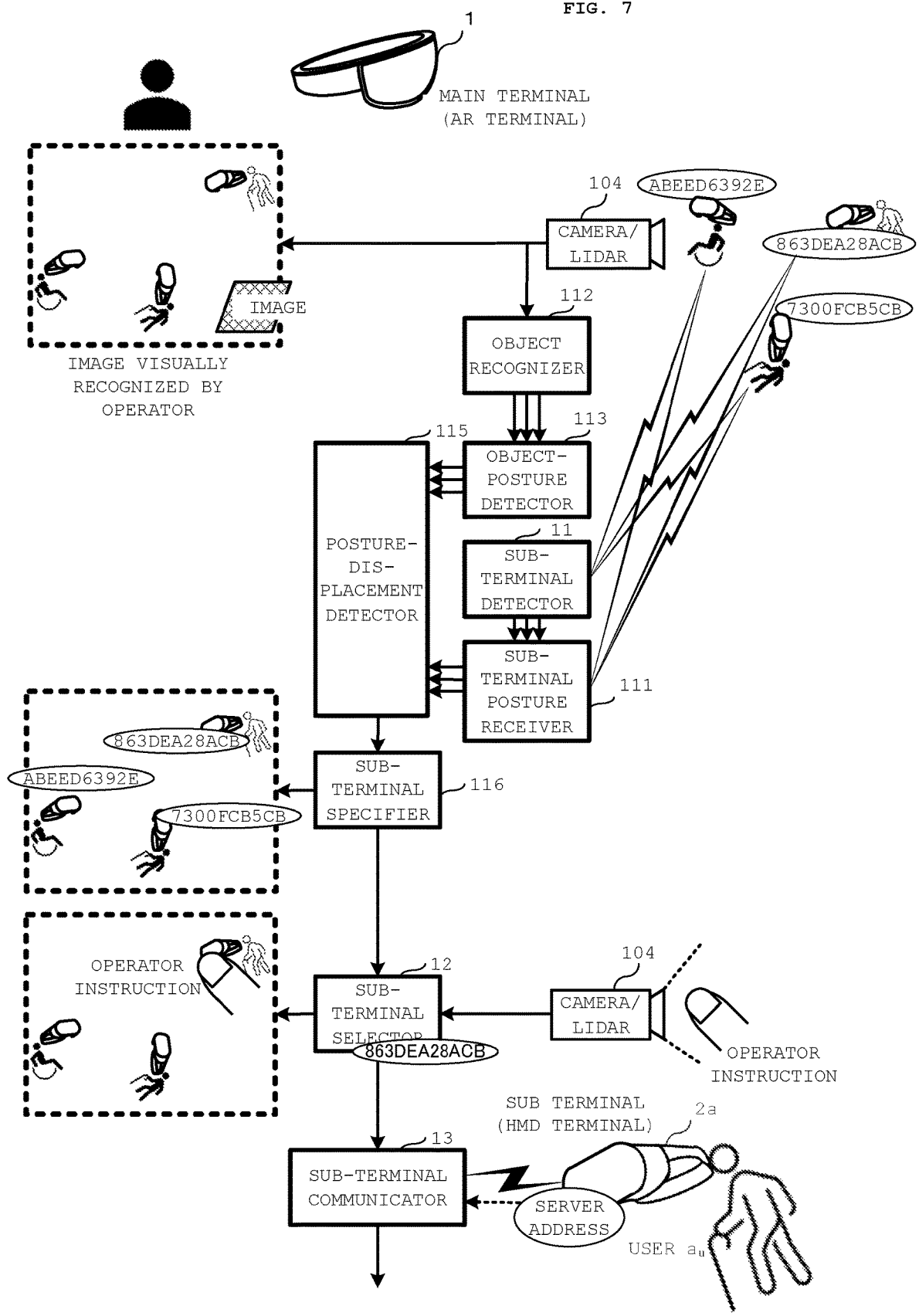
FIG. 7 is a flowchart implemented in a main terminal according to the second invention.

FIG. 6 is a function configuration diagram of a main terminal according to the second invention. FIG. 7 is a flowchart implemented in a main terminal according to the second invention.

According to FIG. 6, the main terminal 1 further includes a sub-terminal posture receiver (sub-terminal posture reception unit) 111, an object recognizer (object recognition unit) 112, an object posture detector (object posture detection unit) 113, a posture displacement detector (posture displacement detection unit) 114, and a sub-terminal specifier (sub-terminal specifying unit) 115 in addition to the configuration shown in FIG. 2. These function configuration units can be regarded as functions embodied when an embodiment of the program according to the present invention is executed, which is stored in a processor and memory (a computation processing system including a memory function) installed in the main terminal 1. Further, in FIG. 6, the processing flow indicated by connecting the function configuration units of the main terminal 1 with arrows is also understood as an embodiment of the method for specifying a terminal according to the present invention.

(Sub-Terminal Posture Receiver 111)

The sub-terminal posture receiver (sub-terminal posture reception unit) 111 is configured to receive, from each of the sub terminals 2 detected by the sub-terminal detector 11, a sub-terminal posture $T_{H2}$ (a position v and an inclination r) in a sub-terminal coordinate system H for every lapse of a predetermined time (Δt). The sub-terminal posture $T_{H2}$ in the sub terminal coordinate system H is detected by the posture sensor 205 of the sub terminal 2.

$T_{H2}$: a sub-terminal posture in the sub-terminal coordinate system H

The sub-terminal posture $T_{H2}$ in the sub-terminal coordinate system H at every predetermined time in each of the sub terminals 2 is output to the posture displacement detector 114.

(Object Recognizer 112)

The object recognizer (object recognition unit) 112 is configured to recognize a plurality of sub terminals 2 present in a real space as objects on the basis of an image photographed by the camera 104.

The sub terminals 2 are captured in the image in various shapes depending on a visual point even if they are the same objects in the real space. A robust characteristics extraction technology is used so that the sub terminals 2 can be detected as the same objects even if the shape of the sub terminal 2 changes. For example, the objects of the sub terminals 2 may be recognized using an object recognition engine that has learned in advance the appearance of the sub terminal 2 (for example, the appearance of HMD terminal). Generally, a class classification technology such as scale-invariant feature transform (SIFT) and deep neural networks is available. Such characteristics extraction technologies are applicable to both 2D images and 3D images (or point cloud). As the simplest case of 2D images, the object recognizer 112 may recognize, for example, markers attached to the sub terminals 2 themselves. The markers may be, for example, two-dimensional QR codes (Registered Trademark).

(Object Posture Detector 113)

The object posture detector (object posture detection unit) 113 is configured to detect, for each of (the objects of) the sub terminals 2, a sub-terminal posture $T_{A2}$ in a main-terminal coordinate system A relating to the posture sensor 105 of the main terminal 1 for every lapse of a predetermined time (Δt).

$T_{A2}$: a sub-terminal posture in the main-terminal coordinate system A

The object posture detector 113 detects, from an image photographed by the camera, a position v and an inclination r in the main-terminal coordinate system A for each of the objects of the sub terminals 2 recognized by the object recognizer 112. Then, the object posture detector 113 detects a posture matrix composed of the position v and a rotation matrix R derived from the inclination r as a sub-terminal posture $T_{A2}$ in the main-terminal coordinate system A. According to FIG. 5, the sub-terminal posture $T_{A2}$ in the main-terminal coordinate system A is derived from a position v and an inclination r with respect to a front surface for a user (front surface which the user is facing) wearing the sub terminal 2 (HMD terminal) captured in the image. The front surface for the user is specified on the basis of the position of a predetermined marker placed on the sub terminal 2.

When an object (for example, a marker) is reflected in a 2D image photographed by the camera 104, the object is captured with a different angle depending on a direction of the camera. From the image shape of the object captured in the image, the posture (position v and inclination r) of the object can be detected (see, for example, NPL 3). Specifically, detected are a position vector representing the central position of the marker and a rotation axis vector in which x and y axes are parallel to two sides of the marker, respectively, and z axis is perpendicular to the x and y axes.

The rotation axis vector refers to a vector that expresses, according to the Rodrigues' rotation formula, an axis direction and a rotation angle as a direction and a norm, respectively, when an object is rotated to have an arbitrary inclination. Specifically, the posture (position v and inclination r) of an object may be detected using an aruco of Open CV (Registered Trademark) that has a marker detection function (see, for example, NPL 4).

Note that the sub-terminal posture $T_{A2}$ in the main-terminal coordinate system A is greatly affected by an object detection place (for example, a marker location), and is therefore preferably corrected by a posture correction matrix.

$$T_{A2} = T_{A1} T_{1s} T_{S2} T_c$$

$T_{A1}$: a main-terminal posture in the main-terminal coordinate system A
$T_{1s}$: a posture of a camera (sensor) coordinate system in a main-terminal posture coordinate system
$T_{S2}$: a posture of a sub terminal recognized on image in the camera (sensor) coordinate system
$T_c$: a posture correction matrix Here, the main-terminal posture coordinate system refers to a coordinate system in which the main-terminal posture in the main-terminal coordinate system A is set as a reference. As described above, processing for performing transformation from the sensor coordinate system to the main-terminal coordinate system is actually required with respect to the sub-terminal posture.

(Posture-Displacement Detector 114)

The posture-displacement detector (posture-displacement detection unit) 114 is configured to receive, for each of the sub terminals, a sub-terminal posture $T_{H2}$ in the sub-terminal coordinate system H from the sub-terminal posture receiver 111 and receive a sub-terminal posture $T_{A2}$ in the main-terminal coordinate system A from the object posture detector 113, for every lapse of a predetermined time ($\Delta t$).

(Time t)

A sub-terminal posture $T_{H21}$ (t) in the sub-terminal coordinate system H of a sub terminal 21
A sub-terminal posture $T_{H22}$ (t) in the sub-terminal coordinate system H of a sub terminal 22
A sub-terminal posture $T_{H23}$ (t) in the sub-terminal coordinate system H of a sub terminal 23
A sub-terminal posture $T_{A2a}$ (t) in the main-terminal coordinate system A of an object $a_o$ recognized on image
A sub-terminal posture $T_{A2b}$ (t) in the main-terminal coordinate system A of an object $b_o$ recognized on image
A sub-terminal posture $T_{A2c}$ (t) in the main-terminal coordinate system A of an object c. recognized on image (Time t+$\Delta t$)

A sub-terminal posture $T_{H21}$ (t+$\Delta t$) in the sub-terminal coordinate system H of the sub terminal 21
A sub-terminal posture $T_{H22}$ (t+$\Delta t$) in the sub-terminal coordinate system H of the sub terminal 22
A sub-terminal posture $T_{H23}$ (t+$\Delta t$) in the sub-terminal coordinate system H of the sub terminal 23
A sub-terminal posture $T_{A2a}$ (t+$\Delta t$) in the main-terminal coordinate system A of the object $a_o$ recognized on image
A sub-terminal posture $T_{A2b}$ (t+$\Delta t$) in the main-terminal coordinate system A of the object $b_o$ recognized on image
A sub-terminal posture $T_{A2c}$ (t+$\Delta t$) in the main-terminal coordinate system A of the object $c_o$ recognized on image Then, the posture displacement detector 114 detects displacement $\Delta T_{H2}$ of the sub-terminal posture $T_{H2}$ in the sub-terminal coordinate system H and displacement $\Delta T_{A2}$ of the sub-terminal posture $T_{A2}$ in the main-terminal coordinate system A.

Displacement of the sub-terminal posture $T_{H21}$ in the sub-terminal coordinate system H of the sub terminal 21:

$$\Delta T_{H21} = (T_{H21}(t))^{-1} T_{H21}(t + \Delta t)$$

Displacement of the sub-terminal posture $T_{H22}$ in the sub-terminal coordinate system H of the sub terminal 22:

$$\Delta T_{H22} = (T_{H22}(t))^{-1} T_{H22}(t + \Delta t)$$

Displacement of the sub-terminal posture $T_{H23}$ in the sub-terminal coordinate system H of the sub terminal 23:

$$\Delta T_{H23} = (T_{H23}(t))^{-1} T_{H23}(t + \Delta t)$$

Displacement of the sub-terminal posture $T_{A2a}$ in the main-terminal coordinate system A of the object $a_o$ recognized on image:

$$\Delta T_{A2a} = (T_{A2a}(t))^{-1} T_{A2a}(t + \Delta t)$$

Displacement of the sub-terminal posture $T_{A2b}$ in the main-terminal coordinate system A of the object $b_o$ recognized on image:

$$\Delta T_{A2b} = (T_{A2b}(t))^{-1} T_{A2b}(t + \Delta t)$$

Displacement of the sub-terminal posture $T_{A2c}$ in the main-terminal coordinate system A of the object $c_o$ recognized on image:

$$\Delta T_{A2c} = (T_{A2c}(t))^{-1} T_{A2a}(t + \Delta t)$$

Figure 8:
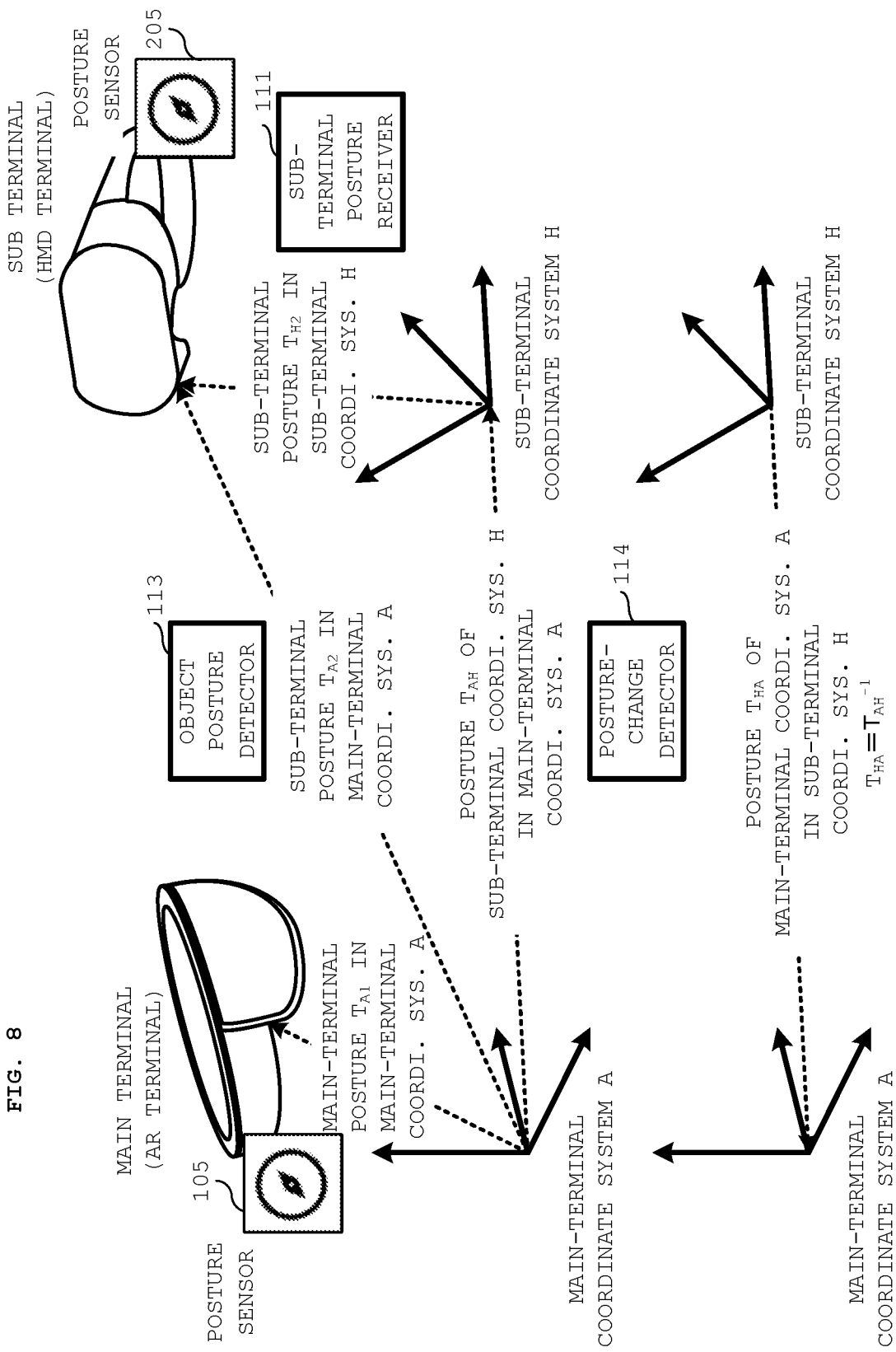
FIG. 8 is an explanatory diagram showing the relationship between a main-terminal coordinate system and a sub-terminal coordinate system in the second invention.
Figure 9A:
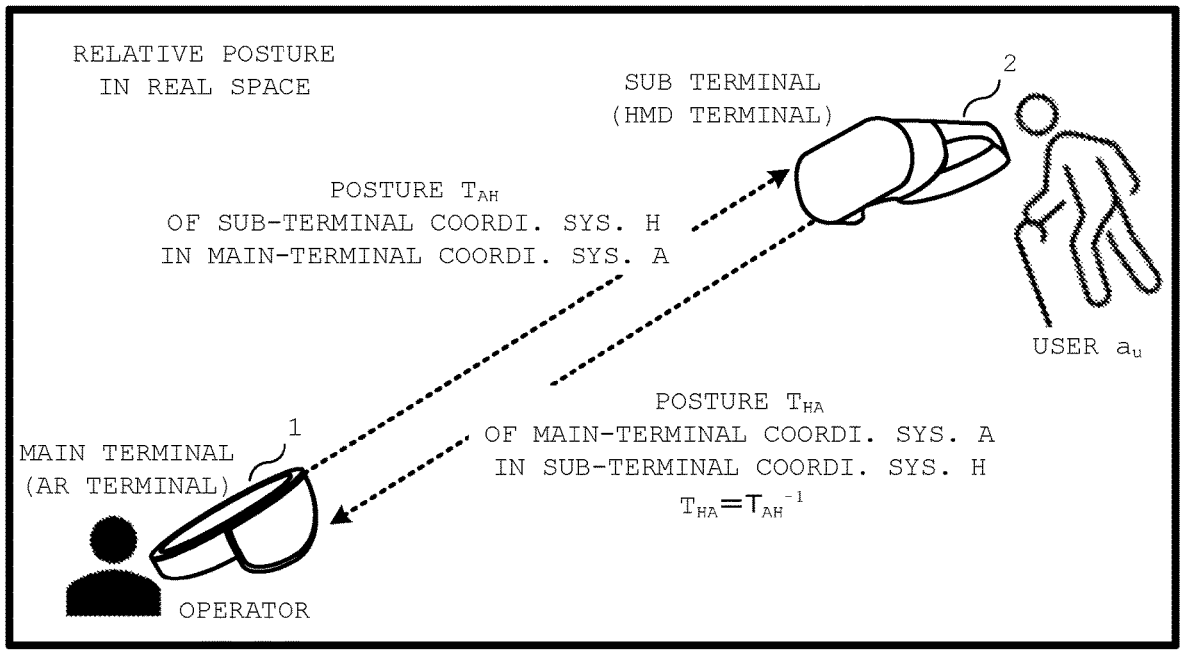
FIGS. 9A and 9B are explanatory diagrams showing the relationship between a real space and a virtual space in the second invention.
Figure 9B:
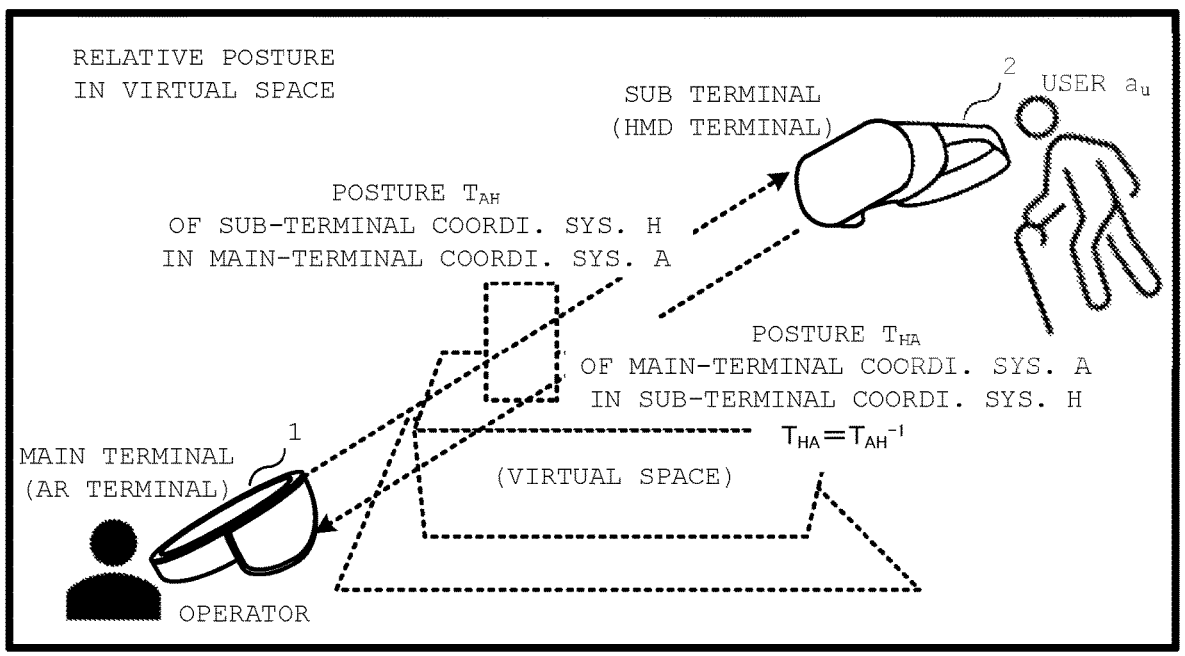

FIG. 8 is an explanatory diagram showing the relationship between a main-terminal coordinate system and a sub-terminal coordinate system in the second invention. FIGS. 9A and 9B are explanatory diagrams showing the relationship between a real space and a virtual space in the second invention.

In FIG. 8, even a sub terminal as a single object has a different posture when a reference coordinate system is different. Further, the sub-terminal coordinate system H also has a different posture when a different main-terminal coordinate system A is set as a reference.

$T_{A1}$: a main-terminal posture in the main-terminal coordinate system A
$T_{A2}$: a sub-terminal posture in the main-terminal coordinate system A
$T_{H2}$: a sub-terminal posture in the sub-terminal coordinate system H
$T_{AH}$: a relative posture of the sub-terminal coordinate system H with respect to the main-terminal coordinate system A $T_{HA}$: a relative posture of the main-terminal coordinate system A with respect to the sub-terminal coordinate system H The main-terminal posture $T_{A1}$ in the main terminal coordinate system A is detected by the posture sensor 105 installed in the main terminal 1. The sub-terminal posture $T_{H2}$ in the sub-terminal coordinate system H is detected by the posture sensor 205 installed in the sub terminal 2. The main terminal 1 receives the sub-terminal posture $T_{H2}$ in the sub-terminal coordinate system H from the sub terminal 2. The sub-terminal posture $T_{A2}$ in the main-terminal coordinate system A is detected, by the object posture detector 114, from an object captured in an image photographed by the camera 104 of the main terminal 1.

A relative posture in a real space can be, for example, a relative posture $T_{AH}$ of the sub-terminal coordinate system H with respect to the main-terminal coordinate system A that is calculated from the sub-terminal posture $T_{A2}$ in the main-terminal coordinate system A and the sub-terminal posture $T_{H2}$ in the sub-terminal coordinate system H. The relative posture is calculated as follows.

$$T_{AH} = T_{A2} T_{H2}^{-1}$$

$T_{A2}$: a sub-terminal posture in the main-terminal coordinate system A $T_{H2}^{-1}$: an inverse matrix of the sub-terminal posture $T_{H2}$ in the sub-terminal coordinate system H According to FIGS. 9A and 9B, the relative posture $T_{AH}$ Of the sub-terminal coordinate system H with respect to the main-terminal coordinate system A and the relative posture $T_{HA}$ of the main-terminal coordinate system A with respect to the sub-terminal coordinate system H can be inverse matrices (inverse transformation) of each other, which shows the relationship between the real space and the virtual space.

$T_{AH}$: a relative posture of the sub-terminal coordinate system H with respect to the main-terminal coordinate system A $T_{HA}$: a relative posture of the main-terminal coordinate system A with respect to the sub-terminal coordinate system H $$T_{AH} = T_{HA}^{-1}$$

(Sub-Terminal Specifier 115)

The sub-terminal specifier (sub-terminal specification unit) 115 is configured to specify, for each of the sub terminals, a sub terminal with a sub-terminal posture displacement $\Delta T_{A2}$ in the main-terminal coordinate system A that is the closest to the displacement $\Delta T_{H2}$ of the sub-terminal posture $T_{H2}$ in the sub-terminal coordinate system H, and make a terminal identifier of the each of the sub terminals correspond to the sub terminal specified (recognized) from the image.

(Sub-Terminal ID) (Object Recognized on Image)

Sub terminal 21>-<Sub terminal $a_o$
Sub terminal 22>-<Sub terminal $c_o$
Sub terminal 23>-<Sub terminal $b_o$ The sub-terminal specifier 115 may use a matrix norm that is the sum of absolute values of differences between respective elements of $\Delta T_A$ and respective elements of $\Delta T_H$, which is calculated for each $\Delta T_A$ and each $\Delta T_H$, to make sub terminals having minimum difference in displacement correspond to each other. As another method, a vector difference may be calculated using position v or inclination r extracted from each $\Delta T_A$ and position v or inclination r extracted from each $\Delta T_H$, and vector norms showing the size of the vector differences may be applied. Alternatively, a rotation axis vector may be calculated from inclination r extracted from each $\Delta T_A$ and inclination r extracted from each $\Delta T_H$, and the norms of the rotation axis vectors may be applied. The sub terminals in which the norm is a threshold or less and is the smallest are made to correspond to each other.

(Sub Terminal Selector 12)

The above-described sub-terminal selector (sub-terminal selection unit) 12 shown in FIG. 6 is configured to cause an operator to select one object of the sub terminal (perform selecting operation) among a plurality of sub terminals present in a real space captured in an image photographed by the camera 104.

As shown in FIG. 7, when a finger of an operator is captured by the camera 104, the sub-terminal selector 12 is capable of specifying an object indicated by the finger and selecting a sub terminal 2 on the image (see, for example, NPLs 6 and 7). Specifically, the sub-terminal selector 12 determines the occurrence of a collision between an object in the image recognized as the sub terminal 2 and an object in the image recognized as the finger.

Thus, as the second invention of the present application, it is possible to select a sub terminal present at a position visually recognizable in the real space from the perspective of the main terminal and communicate with the selected sub terminal.

As described in detail above, according to the first invention of the present application, it is possible to enter the same virtual space as a sub terminal present at a position visually recognizable in a real space from the perspective of a main terminal. Further, according to the second invention of the present application, it is possible to select a sub terminal present at a position visually recognizable in a real space from the perspective of a main terminal and communicate with the sub terminal.

The foregoing embodiments are by way of examples of the present invention only and are not intended to limit thereto, thus many widely different alternations and modifications of the present invention may be constructed. Accordingly, the present invention is to be limited only as defined by the following claims and equivalents thereto.

REFERENCE SIGNS LIST

1 main terminal; 101 display; 102 narrow-area communicator; 103 wide-area communicator; 104 camera; 105 posture sensor; 11 sub-terminal detector; 12 sub-terminal selector; 13 sub-terminal communicator; 14 server accessor; 111 sub-terminal posture receiver; 112 object recognizer; 113 object posture detector; 114 posture-displacement detector; 115 sub-terminal specifier; 2 sub terminal; and 3 virtual space server.

The invention claimed is:

1. A main terminal capable of communicating with a plurality of sub terminals present at positions visually recognizable in a real space, the main terminal comprising:
a sub-terminal detector configured to acquire a terminal identifier from each of the sub terminals;
a sub-terminal selector configured to select one of the sub terminals according to an operator operation;

a sub-terminal communicator configured to receive, as a response from the selected sub terminal, a server address of a virtual space server to which the selected sub terminal is logged in; and a server accessor configured to log in to the virtual space server to which the selected sub terminal is logged in by using the server address received from the selected sub terminal, the main terminal being configured to enter a same virtual space as the selected sub terminal.

2. The main terminal as claimed in claim 1, wherein the server accessor accesses a virtual space server located on an external network via a wide-area communication, a locally-placed virtual space server via a narrow-area communication, or a virtual space server installed in the sub terminal via a narrow-area communication.

3. The main terminal as claimed in claim 1, the main terminal comprising a camera and a posture sensor and further comprising:

a sub-terminal posture receiver configured to receive, at every predetermined time, a sub-terminal posture TH2 in a sub-terminal coordinate system H from each of the sub terminals whose terminal identifiers are acquired by the sub-terminal detector;

an object recognizer configured to recognize a plurality of sub terminals in a real space from an image photographed by the camera;

an object posture detector configured to detect, for each of the sub terminals, a sub-terminal posture TA2 in a main-terminal coordinate system A relating to the posture sensor of the main terminal from an image photographed by the camera at every predetermined time;

a posture-displacement detector configured to detect, for each of the sub terminals, a displacement ΔTH2 of the sub-terminal posture TH2 in the sub-terminal coordinate system H and a displacement ΔTA2 of the sub-terminal posture TA2 in the main-terminal coordinate system A at every predetermined time; and a sub-terminal specifier configured to specify, for each of the sub terminals, a sub terminal with a displacement ΔTA2 of the sub-terminal posture TA2 in the main-terminal coordinate system A, the displacement ΔTA2 being closest to the displacement ΔTH2 of the sub-terminal posture TH2 in the sub-terminal coordinate system H, and make a terminal identifier of the each of the sub terminals correspond to the sub terminal specified from the image, wherein the sub-terminal selector causes an object of one sub terminal among a plurality of sub terminals in the real space captured in the image photographed by the camera to be selected according to an operator operation.

4. The main terminal as claimed in claim 3, wherein the sub terminal comprises a posture sensor, wherein the sub-terminal posture TA2 in the main-terminal coordinate system A is derived from a position v and an inclination r of the sub terminal captured in the image, the position v and inclination r being values relative to a front surface for a user of the sub terminal, and wherein the sub-terminal posture TH2 in the sub-terminal coordinate system H is detected by the posture sensor of the sub terminal.

5. The main terminal as claimed in claim 4, wherein the front surface for the user of the sub terminal captured in the image, which is used to acquire the sub-terminal posture TA2 in the main-terminal coordinate system A, is determined on the basis of a position of a predetermined marker attached on the sub terminal.

6. The main terminal as claimed in claim 3, wherein the sub-terminal posture receiver receives a position v and an inclination r in the sub-terminal coordinate system H and determines a posture matrix including the position v and a rotation matrix R generated from the inclination r to the sub-terminal posture TH2 in the sub-terminal coordinate system H, and wherein the object posture detector detects, for each of the sub terminals, a position v and an inclination r in the main-terminal coordinate system A from the image photographed by the camera and determines, for each of the sub terminals, a posture matrix including the position v and a rotation matrix R generated from the inclination r to the sub-terminal posture TA2 in the main-terminal coordinate system A.

7. The main terminal as claimed in claim 1, wherein the main terminal is of glasses type, contact-lens type, or head-mounted type, and allows an operator to visually recognize a plurality of sub terminals present in the real space via see-through or with a display that shows an image captured by a camera.

8. A non-transitory computer-readable storage medium on which is stored a program to be executed by a computer mounted on a main terminal communicable with a plurality of sub terminals present at positions visually recognizable in a real space, the program causing the computer to function as:

a sub-terminal detector configured to acquire a terminal identifier from each of the sub terminals;

a sub-terminal selector configured to select one of the sub terminals according to an operator operation;

a sub-terminal communicator configured to receive, as a response from the selected sub terminal, a server address of a virtual space server to which the selected sub terminal is logged in; and a server accessor configured to log in to the virtual space server to which the selected sub terminal is logged in by using the server address received from the selected sub terminal.

9. A system comprising a main terminal and a plurality of sub terminals present at positions visually recognizable in a real space from a perspective of the main terminal, the main terminal comprising:

a sub-terminal detector configured to acquire a terminal identifier from each of the sub terminals;

a sub-terminal selector configured to select one of the sub terminals according to an operator operation;

a sub-terminal communicator configured to receive, as a response from the selected sub terminal, a server address of a virtual space server to which the selected sub terminal is logged in; and a server accessor configured to log in to the virtual space server to which the selected sub terminal is logged in by using the server address received from the selected sub terminal, the sub terminal being configured to reply with the terminal identifier and the server address in response to a request from the main terminal.

* * * * *